United States Patent
Dong et al.

(10) Patent No.: US 10,714,749 B2
(45) Date of Patent: Jul. 14, 2020

(54) HIGH RATE LITHIUM COBALT OXIDE POSITIVE ELECTRODE MATERIAL AND MANUFACTURING METHOD THEREOF

(71) Applicant: HUNAN SHANSHAN ENERGY TECHNOLOGY CO., LTD., Hunan (CN)

(72) Inventors: Hong Dong, Hunan (CN); Xuyao Hu, Hunan (CN); Xiangkang Jiang, Hunan (CN); Xinxin Tan, Hunan (CN); Xu Li, Hunan (CN)

(73) Assignee: HUNAN SHANSHAN ENERGY TECHNOLOGY CO., LTD., Hunan (CN)

( * ) Notice: Subject to any disclaimer, the term of this patent is extended or adjusted under 35 U.S.C. 154(b) by 0 days.

(21) Appl. No.: 16/304,309

(22) PCT Filed: Apr. 27, 2017

(86) PCT No.: PCT/CN2017/082231
§ 371 (c)(1),
(2) Date: Nov. 26, 2018

(87) PCT Pub. No.: WO2017/206633
PCT Pub. Date: Dec. 7, 2017

(65) Prior Publication Data
US 2019/0140277 A1    May 9, 2019

(30) Foreign Application Priority Data

Jun. 1, 2016 (CN) .......................... 2016 1 0381625

(51) Int. Cl.
*H01M 4/525* (2010.01)
*H01M 10/0525* (2010.01)
(Continued)

(52) U.S. Cl.
CPC .......... *H01M 4/525* (2013.01); *C01G 23/005* (2013.01); *C01G 33/00* (2013.01); *C01G 41/00* (2013.01);
(Continued)

(58) Field of Classification Search
CPC .. H01M 4/525; H01M 10/0525; C01G 51/66; C01G 41/00; C01G 33/00; C01G 23/005;
(Continued)

(56) References Cited

U.S. PATENT DOCUMENTS

2009/0081554 A1* 3/2009 Takada .................... H01M 4/13
                                                                 429/322
2010/0173199 A1  7/2010 Hiraki
(Continued)

FOREIGN PATENT DOCUMENTS

CN      103201222       7/2013
CN      103563138 A     2/2014
(Continued)

OTHER PUBLICATIONS

First Office Action of the Chinese application No. 201610381625.6, dated Nov. 27, 2017 and its English translation.
(Continued)

*Primary Examiner* — Andrew J. Oyer
(74) *Attorney, Agent, or Firm* — Cooper Legal Group, LLC

(57) ABSTRACT

A high-rate lithium cobaltate cathode material, which contains a multi-channel network formed by fast ionic conductor $Li_\alpha M'_\gamma O_\beta$, mainly consists of lithium cobaltate. The lithium cobaltate is melted together with the fast ionic conductor $Li_\alpha M'_\gamma O_\beta$ in the form of primary particles to form secondary particles. Besides, the lithium cobaltate is embedded in the multi-channel network formed by fast ionic conductor $Li_\alpha M'_\gamma O_\beta$. The element M' in $Li_\alpha M'_\gamma O_\beta$ is one or
(Continued)

more of Ti, Zr, Y, V, Nb, Mo, Sn, In, La, W and $1 \leq \alpha \leq 4$, $1 \leq \gamma \leq 5$, $2 \leq \beta \leq 12$. The lithium cobaltate cathode material is mainly obtained by uniformly mixing cobaltous oxide impregnated with a hydroxide of M' and lithium source, then by the sintering reaction in an air atmosphere furnace at a high temperature. The product of the present invention can greatly promote the lithium ion conductivity of the lithium cobaltate cathode material during the charging and discharging process of the lithium-ion battery, and improve the rate performance of the material.

9 Claims, 2 Drawing Sheets

(51) Int. Cl.

| | |
|---|---|
| *C01G 41/00* | (2006.01) |
| *C01G 33/00* | (2006.01) |
| *C01G 51/00* | (2006.01) |
| *C01G 23/00* | (2006.01) |
| *H01M 4/02* | (2006.01) |
| *H01M 10/052* | (2010.01) |

(52) U.S. Cl.
CPC ............ *C01G 51/42* (2013.01); *C01G 51/66* (2013.01); *H01M 10/0525* (2013.01); *C01P 2002/52* (2013.01); *C01P 2004/03* (2013.01); *C01P 2004/82* (2013.01); *C01P 2004/84* (2013.01); *C01P 2006/40* (2013.01); *H01M 2004/028* (2013.01)

(58) Field of Classification Search
CPC .. C01G 51/42; C01P 2004/84; C01P 2004/82; C01P 2004/028; C01P 2006/40; C01P 2004/03; C01P 2002/52
See application file for complete search history.

(56) References Cited

U.S. PATENT DOCUMENTS

| | | | | |
|---|---|---|---|---|
| 2013/0295451 | A1* | 11/2013 | Miki | ............... H01M 4/04 429/209 |
| 2016/0014027 | A1 | 1/2016 | Oran et al. | |
| 2016/0014215 | A1 | 1/2016 | Oran et al. | |
| 2016/0014234 | A1 | 1/2016 | Oran et al. | |

FOREIGN PATENT DOCUMENTS

| | | |
|---|---|---|
| CN | 104037407 A | 9/2014 |
| CN | 104282880 | 1/2015 |
| CN | 104505500 A | 4/2015 |
| CN | 104617304 A | 5/2015 |
| CN | 104953096 A | 9/2015 |
| CN | 105047906 A | 11/2015 |
| CN | 105185974 A | 12/2015 |
| CN | 105261754 A | 1/2016 |
| CN | 105870441 | 8/2016 |
| JP | 2000164214 A | 6/2000 |
| JP | 2013137947 A | 7/2013 |
| JP | 2014503956 A | 2/2014 |
| JP | 2018185883 A | 11/2018 |
| WO | 2007004590 A1 | 1/2009 |
| WO | 2009157524 A1 | 12/2011 |
| WO | 2012101501 A1 | 8/2012 |
| WO | 2012164760 A1 | 7/2014 |
| WO | 2017154631 A1 | 1/2019 |

OTHER PUBLICATIONS

Notice of Allowance of the Chinese application No. 201610381625.6, dated Jun. 4, 2018 and its English translation.
International Search Report in the international application No. PCT/CN2017/082231, dated Jul. 25, 2017, 2 pgs.
English translation of the Written Opinion of the International Search Authority in the international application No. PCT/CN2017/082231, dated Jul. 25, 2017, 7 pgs.
Supplementary European Search Report in the European application No. 17805578.6, dated Jun. 13, 2019, 7 pgs.

* cited by examiner

HIGH RATE LITHIUM COBALT OXIDE POSITIVE ELECTRODE MATERIAL AND MANUFACTURING METHOD THEREOF

FIELD OF THE INVENTION

The present invention is involved in a lithium cobaltate cathode material and its preparation method, especially involved in a high-rate lithium cobaltate cathode material and its preparation method.

DESCRIPTION OF RELATED ART

Lithium-ion batteries are widely used in mobile/IT equipment and energy storage due to their high power density, high energy and long life. The lithium-ion battery industry developes rapidly. With the development of electronic products, higher requirements have been put forward for lithium-ion batteries, especially considering its light weight, high current discharge and safety performance.

A vigorous development momentum shown in the e-cigarettes, electronic models (car models, ship models, model aircrafts, etc.), toys, wireless power tools market require lithium-ion batteries with shorter charging times, larger discharge currents, and higher safety performance. And many small appliances are also required to be able to discharge at high rate. Therefore, it has become extremely important to develop high-rate lithium-ion battery that can be used for the above-mentioned high-power electronic devices. Lithium cobaltate cathode material is therefore widely used as a power source for e-cigarettes, electronic, models, toys, wireless power tools, and small appliances due to its high specific capacity and, compaction density, excellent cycle performance, especially high discharge capacity and high plateau when high-rate discharge.

A lithium-ion battery consists of a cathode, an anode, electrolyte, and a separator that prevents short circuit between the cathode and anode plates. During the charging and discharging process of Lithium-ion batteries, $Li^+$ is embedded and extracted from the cathode and anode materials for energy exchange. Lithium cobaltate cathode material stores lithium in the bulk phase, $Li^+$ diffuses from the surface through the bulk phase into the inside of the cathode material. The long diffusion path of lithium ion results in the excessive internal resistance and thus the low discharge capacity and plateau.

In addition, since the power density requirements of the power type lithium battery are continuously increased, the discharge rate is continuously increased from the early 10 C discharge to 20-30 C, and even to 50-60 C discharge for some special demands. The charge and discharge rate of the lithium-ion battery is related to the cathode and anode materials of the battery and the preparation process. The lithium cobaltate cathode material prepared by the prior art is difficult to satisfy the rate performance and cycle performance of the above battery, especially for the rate performance and cycle performance at 50-60 C discharge. Therefore, it is necessary to develop a high-rate lithium cobaltate cathode material which not only has a good capacity and plateau at high rate discharge, but also maintains excellent cycle performance to meet the needs of battery manufacturers.

Contents of the Invention

The technical problem to be solved by the present invention is to overcome the deficiencies and defects mentioned in the above background art, and to provide a high-rate lithium cobaltate cathode material, and a corresponding preparation method which is fast, simple and can effectively improve the product rate performance.

In order to solve the above technical problem, the technical solution proposed by the present invention is a high-rate lithium cobaltate cathode material, which is mainly composed of lithium cobaltate. The lithium cobaltate cathode material as described contains a multi-channel network formed by fast ionic conductor $Li_\alpha M'_\gamma O_\beta$. The lithium cobaltate is melted integrally with the fast ionic conductor $Li_\alpha M'_\gamma O_\beta$ in the form of primary particles, and then forms secondary particles. The lithium cobaltate is embedded in the multi-channel network mentioned above formed by fast ionic conductor $Li_\alpha M'_\gamma O_\beta$. The element M' in $Li_\alpha M'_\gamma O_\beta$ is one or more of Ti, Zr, Y, V, Nb, Mo, Sn, In, La, W, and $1 \leq \alpha \leq 4$, $1 \leq \gamma \leq 5$, $2 \leq \beta \leq 12$.

In the above high-rate lithium cobaltate cathode material, the lithium cobaltate cathode material contains preferably a doping element M, and is represented by a chemical formula of $Li_{1+y}Co_{1-x}M_xO_2 \cdot zLi_\alpha M'_\gamma O_\beta$. Wherein $0 \leq x \leq 0.1$, $-0.01 \leq y \leq 0.01$, $0.005 \leq z \leq 0.01$, and the element M is one or more of Mg, Al, Si, Sc, Ni, Mn, Ga, and Ge.

The outstanding characteristics of the above high-rate lithium cobaltate cathode material of the present invention is that the multi-channel network structure formed by the fast ionic conductor $Li_\alpha M'_\gamma O_\beta$ is separately formed into one phase, and embedded in the lithium cobaltate phase to form a multi-dimensional channel two-phase structure with inter-communication surface.

As an overall technical concept, the present invention also provides a method for preparing the above high-rate lithium cobaltate cathode material. The lithium cobaltate cathode material is mainly obtained by uniformly mixing cobaltous oxide impregnated with a hydroxide of M', lithium source, and an additive containing a doping element M (optional) (dry mixing according to the ratio of $Li_{1+y}Co_{1-x}M_xO_2 \cdot zLi_\alpha M'_\gamma O_\beta$), then by the sintering reaction in an air atmosphere furnace at a high temperature.

In the above method for preparing a high-rate lithium cobaltate cathode material, the cobaltous oxide impregnated with the hydroxide of M' preferably was mainly prepared by the following steps:

The organic compound containing M was dissolved in anhydrous ethanol, the solution was then dissolved and dispersed using a disperser. After fully stirring (0.5~1 hour) evenly, the porous cobalt oxide (Note that it is different from conventional cobalt oxide) was added and stirred for 0.5 to 1.5 hour. Then ethanol solution with a volume ratio of ethanol to water of 5 to 20 was added and stirred for 2 to 5 hours. Finally the cobaltous oxide impregnated with the hydroxide of M' is obtained by suction filtration and drying the filter cake in an oven (preferably 50° C.-70° C.). In the preferred operation of the present invention, the hydroxide of M' was formed by hydrolysis of an organic compound containing M'. The M' hydroxide can be uniformly embedded in the porous cobalt oxide by the hydrolysis to provide a premise and basis for obtaining a high-rate lithium cobaltate cathode material.

In the above method for preparing a high-rate lithium cobaltate cathode material, more preferably, the organic compound containing AC as described is one or more of alkoxide of M', alkyl compound of M', carbonyl compound of M', and carboxyl compound of M'. The porous cobalt oxide as described is prepared by pre-sintering the precursor. The precursor as described is $CoCO_3 \cdot \alpha H_2O$ or $CoC_2O_4 \cdot \alpha H_2O$, wherein $0 \leq \alpha \leq 9$. The average bore diameter distribution of the porous cobalt oxide as described is 100 nm to 500 nm and with the porosity of 0.5% to 5%.

In the above method for preparing a high-rate lithium cobaltate cathode material, more preferably, the porous cobalt oxide was mainly prepared by the following steps:

A small amount of precipitant solution was injected into the reaction kettle and the pH was controlled between 6 and 14. Under strong agitation and inert gas protection, cobalt salt solution, complexing agent solution and the remaining precipitant solution were simultaneously injected into the reaction kettle using parallel flow method to carry out the reaction. The pH was continuously controlled between 6 to 14 during the stirring reaction, and the temperature of the reaction kettle was controlled between 0° C. and 85° C. during the reaction. After all the cobalt salt solution was added. After aging and filtration, the filter cake was obtained, which was dried in an oven (above 100° C., 3-5 h) to obtain the precursor. The precursor was placed in an air atmosphere furnace for pre-sintering, and after sinter, sieve it to obtain the porous cobalt oxide.

In the above method for preparing a high-rate lithium cobaltate cathode material, preferably, the cobalt salt solution is a solution formed by dissolving at least one of $CoCl_2 \cdot bH_2O$, $CoSO_4 \cdot bH_2O$, $Co(NO_3)_2 \cdot bH_2O$ in water, wherein $0 \leq b \leq 6$. The concentration of $Co^{2+}$ in the cobalt salt solution is controlled at 70-200 g/L. The complexing agent solution as described is an ammonia water or an aminocarboxylate solution, and the precipitating agent solution as described is carbonate solution, oxalic acid or oxalate solution. More preferably, when selecting a carbonate solution as the precipitant solution, the chemical formula of the synthesized precursor is $CoCO_3 \cdot \alpha H_2O$. The carbonate solution is one or more of sodium carbonate, potassium carbonate, ammonium carbonate, ammonium bicarbonate solution. When selecting an oxalate or oxalic acid solution as the precipitant solution, the chemical formula of the synthesized precursor is $CoC_2O_4 \cdot \alpha H_2O$. The oxalate solution is one or more of sodium oxalate, potassium oxalate and ammonium oxalate solution.

In the above method for preparing a high-rate lithium cobaltate cathode material, preferably, the aging time is 4 to 8 hours, and the heating mechanism for the pre-sintering is performed by sintering at 300° C. to 500° C. for 2 to 5 hours, and then sintering at 700° C. to 800° C. for 2 to 5 hours.

In the above method for preparing a high-rate lithium cobaltate cathode material, the lithium source is preferably one or more of lithium carbonate, lithium hydroxide or lithium oxide ($Li_2CO_3$, $LiOH$, $Li_2O$). The additive containing the doping element M is at least one of oxide, hydroxide, carboxy oxide, carbonate or basic carbonate of M.

The above technical solution of the present invention is mainly based on the following principles: firstly, the cobaltous oxide impregnated with the hydroxide of M' is used as a raw material. In the sintering process of synthesizing the high-rate lithium cobaltate cathode material, since the ionic radius of M' is much larger than that of $Co^{3+}$, it is not easy to be dissolved into the cobaltate crystal structure, instead, it reacts with lithium ions to form a multi-channel network structure of $Li_\alpha M'_\gamma O_\beta$ phase. Lithium cobaltate primary particles are embedded in a multi-channel network of fast ionic conductors and with which melted together to form secondary particles (see FIG. 1). The multi-channel network structure of the fast ionic conductor $Li_\alpha M'_\gamma O_\beta$ phase forms a multi-dimensional lithium ion transport channel. During the charging process, lithium ions are separated from the bulk phase and diffused through the channel to the surface of the particles, after passing through the conductive agent, and diffused into the electrolyte finally. During the discharge process, lithium ions are diffused from the electrolyte to the surfaces of the secondary particles, passing through the multi-channel network structure of the particles, then transported to the surfaces of the primary particles, and embedded in the lithium cobaltate bulk phase finally. It can be seen that the characteristics of the specific raw materials selected in the present invention determine the characteristics of the finally obtained lithium cobaltate cathode material, and the high rate performance as well. As a further improvement, the present invention particularly provides an embodiment in which the above raw materials can be prepared from porous cobalt oxide and an organic compound containing M'. The organic compound containing M' was sufficiently dissolved in anhydrous ethanol After adding aqueous alcohol solution, the hydrolysis of the metal organic compound was promoted by water to form hydroxide of M', which was sufficiently and uniformly filled into the gap and micropores inside the porous cobalt oxide particles, and formed a continuous film on the surface of the impregnated cobalt oxide particles. As a further improvement, the present invention also provides a method for preparing porous cobalt oxide. a The porous cobalt oxide material was prepared by a specific process condition for subsequent hydrolysis, impregnation and continuous film formation.

In the prior art, the additive containing M' was added in the synthesis step of lithium cobaltate, since the ionic radius of M' is much larger than that of $Co^{3+}$, it is not easy to be dissolved into the lithium cobaltate crystal structure, instead, it is enriched on the surface of the particle to form a fast ion conductor film. Compared with the prior art, the advantage of the present invention is that the present invention provides a porous cobalt oxide impregnation method. Lithium cobaltate is synthesized by using porous cobalt oxide as cobalt source. Lithium cobaltate particles contain multi-channel network structure of $Li_\alpha M'_\gamma O_\beta$ phase. During the charging and discharging process of lithium-ion battery, this phase can be used as a fast channel for lithium ion transport, so that the lithium ion conductivity of lithium cobaltate cathode material is greatly promoted and the rate performance of the material is improved.

BRIEF INTRODUCTION OF THE DRAWINGS

In order to more clearly illustrate the embodiments of the present invention or the technical solutions in the prior art, the drawings used in the embodiments or the prior art description will be briefly described below. It is obvious that the drawings in the following description are some embodiments of the present invention. And those skilled in the art can obtain other drawings based on these drawings without any creative work.

DETAILED DESCRIPTION

In order to facilitate the understanding of the present invention, the present invention will be described more fully and detailed hereinafter in combination with drawings and preferred embodiments. But, the scope of protection of the present invention is not limited to the specific embodiments below.

Unless otherwise specified, all technical terms used hereinafter have the same meaning as commonly understood by those of the ordinary skills in the art. The terminology used herein is for describing specific embodiments, and is not intended to limit the scope of the present invention.

Unless otherwise specified, all kinds of raw materials, reagents, instruments, equipment, etc. used in the present invention can be purchased commercially or prepared by existing methods.

Embodiment 1

A high-rate lithium cobaltate cathode material mainly consists of lithium cobaltate. The lithium cobaltate cathode material contains a multi-channel network formed by fast ionic conductor $Li_2TiO_3$, and the lithium cobaltate is melted together with the fast ionic conductor $Li_2TiO_3$ in the form of primary particles to form secondary particles. The lithium cobaltate is embedded in the multi-channel network formed by the above fast ionic conductor $Li_2TiO_3$. The chemical formula of the lithium cobaltate cathode material of the present embodiment can be represented by $Li_{0.99}CoO_2 \cdot 0.005Li_2TiO_3$ and it has a layered structure.

The method for preparing the high-rate lithium cobaltate cathode material of the present embodiment includes the following steps:

(1) A $CoCl_2$ solution was prepared, the concentration of $Co^{2+}$ in the solution was controlled at 110 g/L. The concentrated ammonium hydroxide and distilled water was used to form a complexing agent ammonium hydroxide solution at a volume ratio of 1:10. 1.2 mol/L sodium bicarbonate solution was used for the precipitant solution.

(2) A volume of ⅓ of the precipitant solution was injected into a 25 L reaction kettle, the pH of the solution was controlled at 6.0 to 8.0. Under the strong agitation and inert gas protection, the $CoCl_2$ solution above-mentioned, ammonium hydroxide solution and sodium bicarbonate solution were simultaneously injected into the reaction kettle by a parallel flow method to carry out the reaction, and the pH was controlled to be 6.0-8.0 during the stirring reaction, the reaction kettle temperature was controlled at 70° C. to 80° C. After the $CoCl_2$ solution was completely injected, a filter cake was obtained by aging for 4-8 hours, and then filtration (3) The filter cake obtained in the above step (2) in an oven at 120° C. for 3 h was dried to obtain cobaltous carbonate (particle size of 5.5 μm).

Figure 2:
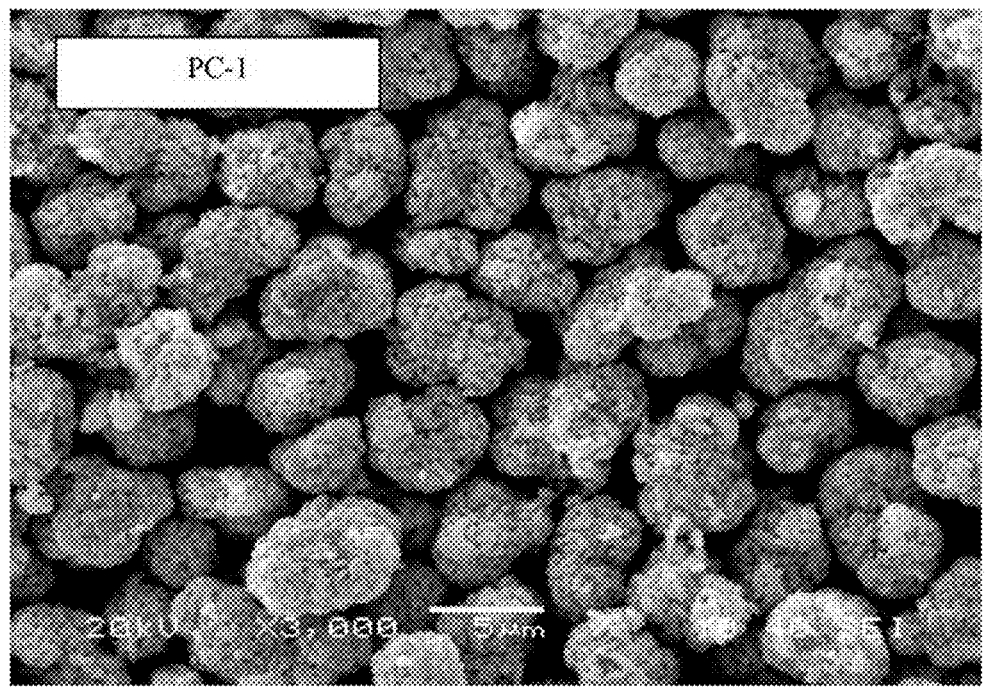
FIG. 2 is the SEM photograph of the porous cobalt oxide before impregnation in embodiment 1 of the present invention.

(4) The cobaltous carbonate obtained in the above step (3) was pre-sintered at 400° C. for 3 h, and then sintered at 750° C. for 3 h to obtain porous cobalt oxide (particle size of 5.0 μm), numbered PC-1 (see FIG. 2), with the average pore diameter of 100 nm and the porosity of 0.5%.

Figure 3:
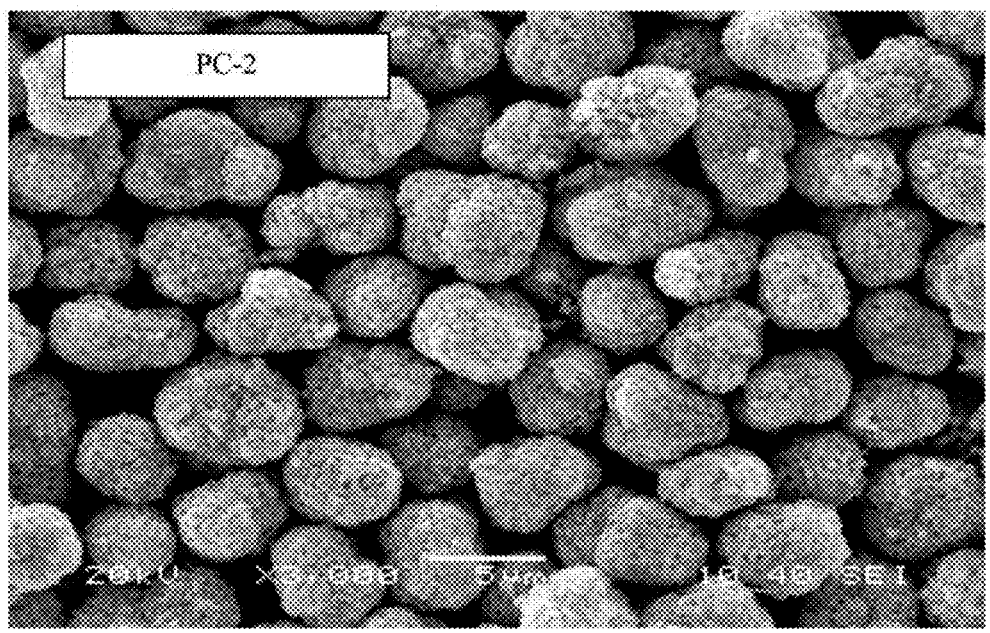
FIG. 3 is the SEM photograph of the porous cobalt oxide after impregnation in embodiment 1 of the present invention.

(5) 42 g of butyl titanate solution was dissolved in 500 g of anhydrous ethanol, and stirred for 0.5 h, 3000 g of porous cobalt oxide PC-1 obtained in the step (4) under vigorous stirring of a disperser was added, stirred for 0.5 h. Then ethanol solution was added, the volume ratio of ethanol to water was 6, and stirred for another 3 h. The filter cake was suction filtered, and dried in an oven to obtain cobalt oxide impregnated with $Ti(OH)_4$, numbered as PC-2 (see FIG. 3).

(6) 920 g of lithium carbonate and 2000 g of cobalt oxide PC-2 obtained in the above step (5) were dry-mixed uniformly to obtain a mixture.

Figure 4:
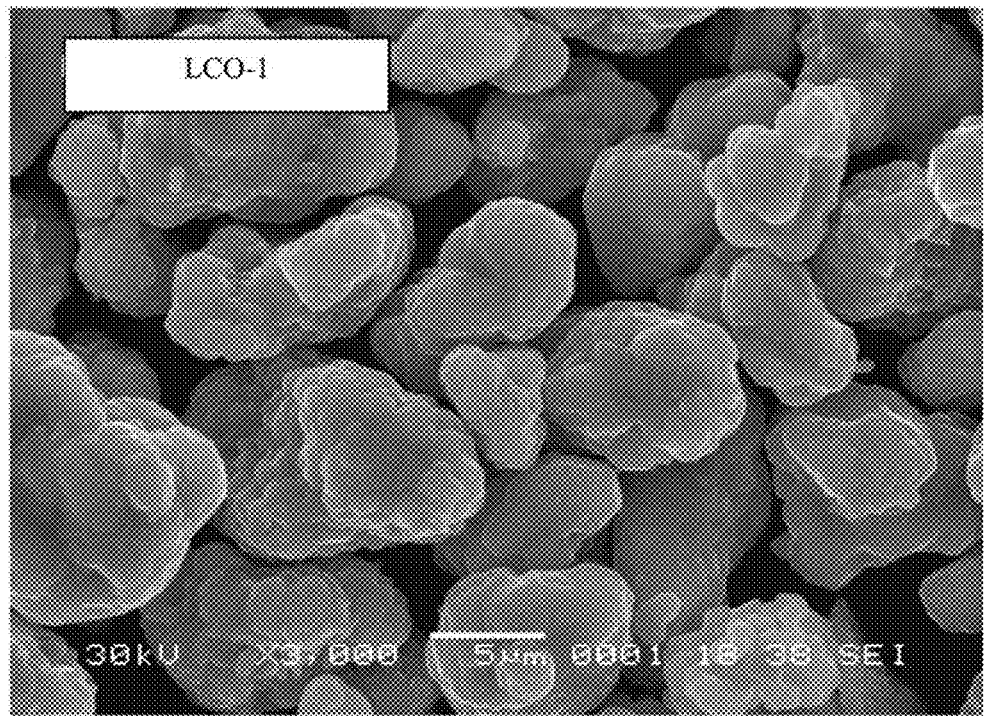
FIG. 4 is the SEM photograph of a lithium cobaltate cathode material LCO-1 in embodiment 1 of the present invention.

(7) The mixture obtained in the above step (6) in an air atmosphere furnace was sintered at 950° C. for 10 h. After cooling, the universal pulverizer was pulverized for 20 s, and the particle size was controlled at 5.5 to 6.0 μm to obtain the high-rate lithium cobaltate cathode material (numbered LCO-1, see FIG. 4).

Embodiment 2

A high-rate lithium cobaltate cathode material mainly consists of lithium cobaltate. The lithium cobaltate cathode material contains a multi-channel network formed by fast ionic conductor $Li_2TiO_3$, and the lithium cobaltate is melted together with the fast ionic conductor $Li_2TiO_3$ in the form of primary particles to form secondary particles. The lithium cobaltate is embedded in the multi-channel network formed by the aforementioned fast ionic conductor $Li_2TiO_3$. The chemical formula of the lithium cobaltate cathode material of the present embodiment can be represented by $Li_{1.00}Co_{0.99}Mg_{0.005}Al_{0.005}O_2 \cdot 0.005Li_2TiO_3$ and it has a layered structure.

The method for preparing the high-rate lithium cobaltate cathode material of the present embodiment includes the following steps:

(1)-(5): steps (1)-(5) of the present embodiment are the same as those of the embodiment 1.

(6) 936 g of lithium carbonate, 2000 g of cobalt oxide PC-2 obtained in the above embodiment 1, 5 g of magnesium oxide and 6.5 g of aluminium oxide were dry-mixed uniformly to obtain a mixture.

(7) The mixture obtained in the above step (6) was sintered in an air atmosphere furnace at 000° C. for 10 h. After cooling, the universal pulverizer was pulverized for 20 s, and the particle size was controlled at 5.5 to 6.0 μm to obtain the high-rate lithium cobaltate cathode material (numbered LCO-2).

Control Embodiment 1

A lithium cobaltate cathode material with a chemical formula of $Li_{0.99}CoO_2 \cdot 0.005Li_2TiO_3$ has a layered structure, wherein the existing form of $Li_2TiO_3$ is mainly enriched on the surface of the particles. The preparation method of the lithium cobaltate cathode material of the present control embodiment specifically includes the following steps:

(1) 920 g of lithium carbonate, 2000 g of PC-1 (synthesized in embodiment 1) and 10 g, of titanium dioxide were dry-mixed uniformly to obtain a mixture.

(2) The mixture obtained in the above step (1) was sintered in an air atmosphere furnace at 950° C. for 10 h. After cooling, the universal pulverizer was pulverized for 20 s, and the particle size was controlled at 5.5 to 6.0 μm to obtain the lithium cobaltate cathode material (numbered LCO-0).

Embodiment 3

A high-rate lithium cobaltate cathode material mainly consists of lithium cobaltate. The lithium cobaltate cathode material contains a multi-channel network formed by fast ionic conductor $LiNbO_3$, and the lithium cobaltate is melted together with the fast ionic conductor $LiNbO_3$ in the form of primary particles to form secondary particles. The lithium cobaltate is embedded in the multi-channel network formed by the aforementioned fast ionic conductor $LiNbO_3$. The chemical formula of the lithium cobaltate cathode material of the present embodiment can be represented by $Li_{1.01}CoO_2 \cdot 0.001LiNbO_3$ and it has a layered structure.

The method for preparing the high-rate lithium cobaltate cathode material of the present embodiment includes the following steps:

(1) A $CoSO_4$ solution was prepared, the concentration of $Co^{2+}$ in the solution was controlled at 150 g/L. The concentrated ammonium hydroxide and distilled water was used to form a complexing agent solution at a volume ratio of 1:10. 1.5 mol/L ammonium oxalate solution was used for the precipitant solution.

(2) A volume of ⅓ of the precipitant solution was injected into a 25 L reaction kettle. Under the strong agitation and inert gas protection, the $CoSO_4$ solution above-mentioned, ammonium hydroxide solution and ammonium oxalate solution were simultaneously injected into the reaction kettle by a parallel flow method to carry out the reaction, and the pH was controlled to be 6.0-7.0 during the stirring reaction, the reaction kettle temperature was controlled at 25° C. After the $CoSO_4$ solution was completely injected, a filter cake was obtained by aging: for 4-8 h, and then filtration.

(3) The filter cake obtained in the above step (2) was dried in an oven at 120° C. for 3 h to obtain cobalt oxalate (particle size of 7.5 μm).

(4) The cobalt oxalate obtained in the above step (3) was pre-sintered at 300° C. for 2 h, and then sinter at 700° C. for 5 h to obtain porous cobalt oxide (particle size of 6.5 μm), numbered PC-3, with the average pore diameter of 500 nm and the porosity of 5%.

(5) 120 g of niobium ethoxide solution was dissolved in 2000 g of anhydrous ethanol, stirred for 0.5 h. 3000 g of porous cobalt oxide PC-3 obtained in the step (4) under vigorous stirring of a disperser was added, stirred for 1.0 h. Then ethanol solution was added, the volume ratio of ethanol to water was 20, and stirred for another 5 h. The cobalt oxide impregnated with $Nb(OH)_5$, numbered as PC-4 was obtained by suction filtration, and drying the filter cake in an oven to obtain.

(6) 938 g of lithium carbonate and 2000 g of cobalt oxide PC-4 which was obtained in the above step (5) were dry-mixed uniformly to obtain a mixture.

(7) The mixture obtained in the above step (6) was sintered in an air atmosphere furnace at 900° C. for 10 h. After cooling, the universal pulverizer was pulverized for 20 s, and the particle size was controlled at 6.5 to 7.0 μm to obtain the high-rate lithium cobaltate cathode material, numbered as LCO-3.

Embodiment 4

A high-rate lithium cobaltate cathode material mainly consists of lithium cobaltate. The lithium cobaltate cathode material contains a multi-channel network formed by fast ionic conductor $Li_2WO_4$, and the lithium cobaltate is melted together with the fast ionic conductor $Li_2WO_4$ in the form of primary particles to form secondary particles. The lithium cobaltate is embedded in the multi-channel network formed by the aforementioned fast ionic conductor $Li_2WO_4$. The chemical formula of the lithium cobaltate cathode material of the present embodiment can be represented by $Li_{1.00}CoO_2 \cdot 0.008Li_2WO_4$ and it has a layered structure.

The method for preparing the high-rate lithium cobaltate cathode material of the present embodiment includes the following steps:

(1) A $Co(NO_3)_2$ solution was prepared, the concentration of $Co^{2+}$ in the solution was controlled at 100 g/L. The concentrated ammonium hydroxide and distilled water was used to form a complexing agent solution at a volume ratio of 1:10. 1.5 mol/L ammonium oxalate solution was used for the precipitant solution.

(2) A volume of ⅓ of the precipitant solution was injected into a 25 L reaction kettle. Under the strong agitation and inert gas protection, the $Co(NO_3)_2$ solution above-mentioned, ammonium hydroxide solution and ammonium oxalate solution were simultaneously injected into the reaction kettle by a parallel flow method to carry out the reaction, and the pH was controlled to be 6.0-7.0 during the stirring reaction, the reaction kettle temperature was controlled at 25° C. After the $Co(NO_3)_2$ solution was completely injected, a filter cake was obtained by aging for 4-8 h, and then filtration.

(3) The filter cake obtained in the above step (2) was dried in an oven at 120° C. for 3 h to obtain cobalt oxalate (particle size of 7.0 μm).

(4) The cobalt oxalate obtained in the above step (3) was pre-sintered at 500° C. for 3 h, and then was sintered at 800° C. for 5 h to obtain porous cobalt oxide (particle size of 6.5 μm), numbered PC-5, with the average pore diameter of 200 nm and the porosity of 1%. p (5) 135 g of tungsten ethanol solution was dissolved in 2500 g of anhydrous ethanol, stirred for 0.5 h. 3000 g of porous cobalt oxide PC-5 obtained in the step (4) under vigorous stirring of a disperser was added, stirred for 1.5 h. Then ethanol solution was added, the volume ratio of ethanol to water is 15, and stirred for another 4 h. The cobalt oxide impregnated with $W(OH)_6$, numbered as PC-6 was obtained by suction filtration, and drying the filter cake in an oven.

(6) 928 g of lithium carbonate and 2000 g of cobalt oxide PC-6 which was obtained in the above step (5) were dry-mixed an to obtain a mixture.

(7) The mixture obtained in the above step (6) was sintered in an air atmosphere furnace at 1000° C. for 10 h. After cooling, the universal pulverizer was pulverized for 20 s, and the particle size was controlled at 6.5 to 7.0 μm to obtain the high-rate lithium cobaltate cathode material, numbered as LCO-4.

The electrochemical properties of the five products obtained in the above Embodiment 1, 2, 3, 4 and control embodiment 1 were tested. The test methods are described below.

Assembly of 063048 type square battery: the active admixture, PVDF and conductive carbon black was mixed in a mass ratio of 95.4:2.5:2.1, then NMP was added and the mixture was stirred to prepare a slurry. The slurry was applied onto an aluminum foil, and dried at 120° C. to obtain a cathode sheet. Then anode sheet, separator, electrolyte, etc were assembled into a 063048 type battery. The charge and discharge performance test of the battery is carried out at room temperature, and the battery is charged by constant current and then constant voltage. When the charge cut-off voltage is 4.2V or 4.35V, using constant current discharge, when the cut-off voltage is 3.0V and the charging current density is 0.5 C, the discharge current density is 0.2 C/1 C/10 C/20 C/50 C.

Table 1. shows the rate performance of the LCO-0/1/2/3/4 tested at different voltages.

TABLE 1 the rate performance of the LCO-0/1/2/3/4 tested at different voltages.

| Number | Test items | 3.0~4.2 V | | | | | 3.0~4.35 V | | | | |
|---|---|---|---|---|---|---|---|---|---|---|---|
| | | 0.2 C | 1 C | 10 C | 20 C | 50 C | 0.2 C | 1 C | 10 C | 20 C | 50 C |
| Embodiment 1 LCO-1 | Rate retention (%) | 100 | 99.9 | 98.5 | 96.7 | 88.6 | 100 | 95.6 | 90.1 | 83.6 | 72.2 |
| | plateau (V) | 3.805 | 3.774 | 3.716 | 3.585 | 3.471 | 3.842 | 3.795 | 3.742 | 3.648 | 3.498 |
| Embodiment 2 LCO-2 | Rate retention (%) | 100 | 99.7 | 97.3 | 94.3 | 87.2 | 100 | 97.6 | 92.3 | 87.2 | 85.7 |
| | plateau (V) | 3.795 | 3.764 | 3.700 | 3.564 | 3.442 | 3.821 | 3.776 | 3.724 | 3.619 | 3.497 |
| control embodiment LCO-0 | Rate retention (%) | 100 | 99.6 | 95.5 | 84.7 | 75.1 | 100 | 94.1 | 85.5 | 64.7 | 45.1 |
| | plateau (V) | 3.791 | 3.752 | 3.685 | 3.544 | 3.427 | 3.804 | 3.751 | 3.642 | 3.511 | 3.409 |
| Embodiment 3 LCO-3 | Rate retention (%) | 100 | 99.9 | 98.5 | 97.7 | 91.2 | 100 | 94.5 | 86.5 | 64.0 | 55.1 |
| | plateau (V) | 3.875 | 3.868 | 3.756 | 3.685 | 3.651 | 3.884 | 3.761 | 3.655 | 3.511 | 3.509 |
| Embodiment 4 LCO-4 | Rate retention (%) | 100 | 99.9 | 98.5 | 97.0 | 89.6 | 100 | 94.9 | 87.2 | 64.7 | 65.1 |
| | plateau (V) | 3.860 | 3.853 | 3.716 | 3.625 | 3.571 | 3.870 | 3.765 | 3.664 | 3.521 | 3.519 |

Figure 1:
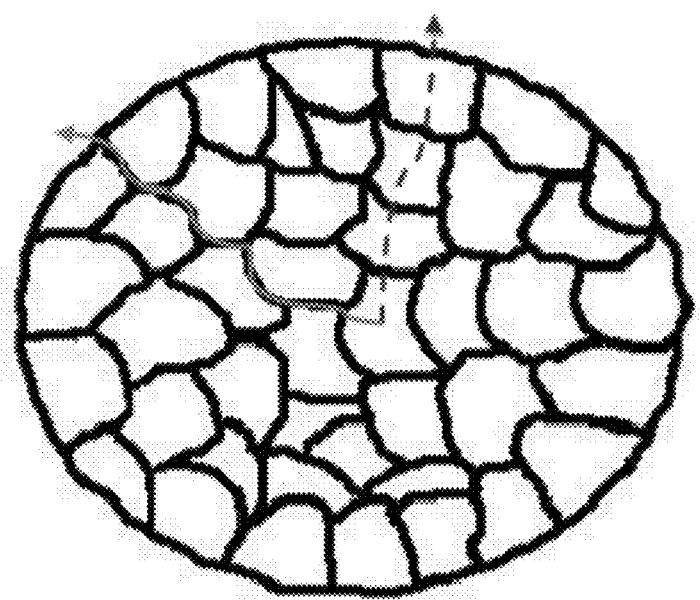
FIG. 1 is the diagram of the lithium ion transport path in the charging process of the lithium cobaltate particles in the present invention, and the discharge process is reversed.

FIG. 1 shows schematic diagram of lithium ion transport during charging of the lithium cobaltate particles of the present invention. The solid line represents the lithium ion transport path in the cathode material particles prepared in the embodiments of the present invention, and the dotted line represents that of the control embodiment. In the process of impregnating porous cobalt oxide with butyl titanate, tetra-n-butyl titanate is hydrolyzed to form $Ti(OH)_4$ which is filled into the gap and micropores inside the porous cobalt oxide particles to form a continuous film on the surface of the impregnated particles. During the sintering process of synthesizing lithium cobaltate, the ionic radius of $Ti^{4+}$ is much larger than that of $Co^{3+}$. It is not easy to be dissolved into the lithium cobalt oxide crystal structure, but reacts with lithium ions to fibrin a multi-channel network structure $Li_2TiO_3$ phase. Lithium cobaltate primary particles are embedded in a multi-channel network of fast ionic conductor and with which melted together to form secondary particles.

As seen from Table 1 above, the capacity retention rate and plateau at 50 C rate of LCO-1/2/3/4 prepared by cobalt oxide impregnated with butyl titanate in the 4.2 V test are both significantly higher than in the control embodiment LCO-0. This indicates that the existence of the LCO-1/2/3/4 multi-channel network structure of fast tome conductor greatly increases the lithium ion transmission rate and effectively increases the discharge capacity and plateau of the material. When LCO-2 is tested at 4.35V, the capacity retention rate and plateau at 50 C rate are significantly higher than those of LCO-1, LCO-3 and LCO-4 in the embodiments. This is caused by that for the 4.35V high-voltage material, Mg and Al doping can effectively improve the structural stability of the material, and thus the rate performance at high voltage is excellent.

The invention claimed is:

1. A high-rate lithium cobaltate cathode material for a liquid state lithium ion battery, the high-rate lithium cobaltate cathode material comprising lithium cobaltate with or without a doping element M and a fast ionic conductor $Li_\alpha M'_\gamma O_\beta$, wherein:

an element M' in $Li_\alpha M'_\gamma O_\beta$ is one or more of Ti, Zr, Y, V, Nb, Mo, Sn, In, La, or W, $1 \leq \alpha \leq 4$, $1 \leq \gamma \leq 5$, and $2 \leq \beta \leq 12$, the lithium cobaltate with or without the doping element M is represented by $Li_{1+y}Co_{1-x}M_xO_2$, the doping element M is one or more of Mg, Al, Si, Sc, Ni, Mn, Ga, or Ge, $0 \leq x \leq 0.1$, and $-0.01 \leq y \leq 0.01$, the high-rate lithium cobaltate cathode material is represented by a chemical formula of $Li_{1+y}Co_{1-x}M_xO_2 \cdot zLi_\alpha M'_\gamma O_\beta$, and $0.005 \leq z \leq 0.01$, the high-rate lithium cobaltate cathode material comprises a multi-channel network formed by the fast ionic conductor $Li_\alpha M'_\gamma O_\beta$, the lithium cobaltate with or without the doping element M, as primary particles, is melted integrally with the fast ionic conductor $Li_\alpha M'_\gamma O_\beta$ so as to form secondary particles, and the lithium cobaltate with or without the doping element M is embedded in the multi-channel network formed by the fast ionic conductor $Li_\alpha M'_\gamma O_\beta$.

2. A method for preparing a high-rate lithium cobaltate cathode material comprising lithium cobaltate with or without a doping element M and a fast ionic conductor $Li_\alpha M'_\gamma O_\beta$, wherein:

an element M' in $Li_\alpha M'_\gamma O_\beta$ is one or more of Ti, Zr, Y, V, Nb, Mo, Sn, In, La, or W, $1 \leq \alpha \leq 4$, $1 \leq \gamma \leq 5$, and $2 \leq \beta \leq 12$, the lithium cobaltate with or without the doping element M is represented by $Li_{1+y}Co_{1-x}M_xO_2$, the doping element M is one or more of Mg, Al, Si, Sc, Ni, Mn, Ga, or Ge, $0 \leq x \leq 0.1$, and $-0.01 \leq y \leq 0.01$, the high-rate lithium cobaltate cathode material comprises a multi-channel network formed by the fast ionic conductor $Li_\alpha M'_\gamma O_\beta$, the lithium cobaltate with or without the doping element M, as primary particles, is melted integrally with the fast ionic conductor $Li_\alpha M'_\gamma O_\beta$ so as to form secondary particles, the lithium cobaltate with or without the doping element M is embedded in the multi-channel network formed by the fast ionic conductor $Li_\alpha M'_\gamma O_\beta$, and the method comprises:

mixing cobaltous oxide impregnated with a hydroxide of the element M' and a lithium source to obtain a homogenous mixture; and sintering the homogenous mixture in an air atmosphere furnace at a high temperature, or mixing cobaltous oxide impregnated with a hydroxide of the element M', a lithium source and an additive containing the doping element M to obtain a homogenous mixture; and sintering the homogenous mixture in an air atmosphere furnace at a high temperature.

3. The method according to claim 2, wherein the method further comprises the following steps to obtain the cobaltous oxide impregnated with the hydroxide of the element M':

dissolving an organic compound containing the element M' in anhydrous ethanol under stirring to obtain a solution;

adding a porous cobalt oxide into the solution;

dispersing the porous cobalt oxide into the solution with a disperser for 0.5-1 h;

adding an aqueous ethanol solution with a volume ratio of ethanol to water of 5 to 20 and stirring for 2 to 5 h;

filtering under vacuum to obtain a first filter cake; and drying the first filter cake to obtain the cobaltous oxide impregnated with the hydroxide of the element M'.

4. The method according to claim 3, wherein:

the method further comprises pre-sintering a precursor to obtain the porous cobalt oxide, the porous cobalt oxide has a porosity of 0.5% to 5%, the porous cobalt oxide has an average pore size ranging from 100 nm to 500 nm, the precursor is $CoCO_3 \cdot \alpha H_2O$ or $CoC_2O_4 \cdot \alpha H_2O$, and $0 \leq \alpha \leq 9$, and the organic compound containing the element M' is one or more of an alkoxide of the element M', an alkyl compound of the element M', a carbonyl compound of the element M', or a carboxyl compound of the element M'.

5. The method according to claim 4, wherein the method further comprises the following steps to obtain the porous cobalt oxide:

injecting a part of a precipitant solution with a pH of 6-14 into a reaction kettle;

simultaneously adding a cobalt salt solution, a complexing agent solution and a remaining part of the precipitant solution into the reaction kettle by parallel flows, under stirring and protection of an inert gas, such that a reaction mixture is formed and a reaction starts, wherein the reaction is performed at a pH of 6-14 and at a temperature of 0° C. to 85° C.;

aging the reaction mixture after the cobalt salt solution is completely added into the reaction kettle;

filtering the reaction mixture to obtain a second filter cake;

drying the second filter cake to obtain the precursor;

subjecting the precursor to the pre-sintering in an air atmosphere furnace; and sieving the pre-sintered precursor to obtain the porous cobalt oxide.

6. The method according to claim 5, wherein:

the cobalt salt solution is a solution formed by dissolving at least one of $CoCl_2 \cdot bH_2O$, $CoSO_4 \cdot bH_2O$, or $Co(NO_3)_2 \cdot bH_2O$ in water, and $0 \leq b \leq 6$, a concentration of $Co^{2+}$ in the cobalt salt solution is 70-200 g/L, the complexing agent solution is an ammonia water or an aminocarboxylate solution, and the precipitant solution is a carbonate solution, an oxalic acid, or an oxalate solution.

7. The method according to claim 5 wherein:

an aging time for aging the reaction mixture after the cobalt salt solution is completely added into the reaction kettle is 4 to 8 hours, and the subjecting the precursor to the pre-sintering in an air atmosphere furnace comprises firstly sintering at 300° C. to 500° C. for 2 to 5 hours, and then sintering at 700° C. to 800° C. for 2 to 5 hours.

8. The method according to claim 2, wherein:

the lithium source is one or more of lithium carbonate, lithium hydroxide, or lithium oxide, and the additive containing the doping element M is at least one of oxide, hydroxide, carboxylate, carbonate, or basic carbonate of the doping element M.

9. The method according to claim 2, wherein the sintering is performed at 850° C. to 1000° C. for 6 to 20 hours.

* * * * *